US011424886B2

(12) United States Patent
Bhanage et al.

(10) Patent No.: US 11,424,886 B2
(45) Date of Patent: Aug. 23, 2022

(54) ALTERING ANTENNA CONFIGURATION USING NETWORK AND CLIENT CONDITIONS

(71) Applicant: Cisco Technology, Inc., San Jose, CA (US)

(72) Inventors: Gautam D. Bhanage, Milpitas, CA (US); John M. Blosco, Norton, OH (US); Sivadeep R. Kalavakuru, Akron, OH (US); Xiangxiang Fang, Campbell, CA (US); Khashayar Mirfakhraei, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 287 days.

(21) Appl. No.: 16/864,052

(22) Filed: Apr. 30, 2020

(65) Prior Publication Data

US 2021/0344461 A1 Nov. 4, 2021

(51) Int. Cl.
*G01R 29/10* (2006.01)
*H04L 5/00* (2006.01)
*H04W 24/02* (2009.01)

(52) U.S. Cl.
CPC .............. *H04L 5/005* (2013.01); *H04W 24/02* (2013.01)

(58) Field of Classification Search
CPC ................................ H04L 5/005; H04W 24/02
USPC ........ 343/700, 703, 725–729, 810, 821–822, 343/824–826, 844, 852–853
See application file for complete search history.

(56) References Cited

U.S. PATENT DOCUMENTS

| | | | | | |
|---|---|---|---|---|---|
| 4,994,813 | A | * | 2/1991 | Shiramatsu | H01Q 3/267 342/372 |
| 5,444,455 | A | * | 8/1995 | Louzir | H01Q 11/08 343/837 |
| 6,486,835 | B1 | * | 11/2002 | Wakeham | H01Q 1/244 343/702 |
| 7,116,723 | B2 | * | 10/2006 | Kim | H04B 7/0639 375/267 |
| 8,207,898 | B2 | * | 6/2012 | Koyanagi | H01Q 5/328 343/702 |

(Continued)

FOREIGN PATENT DOCUMENTS

| | | |
|---|---|---|
| CN | 102124789 A | 7/2011 |
| EP | 2316241 A1 | 5/2011 |

(Continued)

*Primary Examiner* — Thai D Hoang
(74) *Attorney, Agent, or Firm* — Patterson + Sherdan, LLP

(57) ABSTRACT

Embodiments for preliminary antenna configuration for a radio in an access point are described. A preliminary antenna configuration with a first number of antennas transmitting at a first power level based on a maximum transmission power for the radio is used to determine a second antenna configuration based on network level factors, where the second antenna configuration includes a second number of antennas. The second antenna configuration is used to determine a third antenna configuration from the second antenna configuration, where the third antenna configuration includes a third number of antennas transmitting at a third power level based on a client transmission factors for a plurality of client devices connected to the access point. The third antenna configuration is used to transmit network traffic from the access point to the plurality of client devices using the third antenna configuration.

20 Claims, 3 Drawing Sheets

(56) References Cited

U.S. PATENT DOCUMENTS

| | | | |
|---|---|---|---|
| 9,031,044 B2 | 5/2015 | Sampath et al. | |
| 9,055,541 B2 | 6/2015 | Patel et al. | |
| 10,187,133 B2 | 1/2019 | Forenza et al. | |
| 2009/0026579 A1* | 1/2009 | Silver | H01Q 1/248 343/824 |
| 2009/0213021 A1* | 8/2009 | Yun | H01Q 1/521 343/726 |
| 2011/0043418 A1* | 2/2011 | Teshirogi | H04B 17/327 343/703 |
| 2011/0077044 A1 | 3/2011 | Sampath et al. | |
| 2011/0133999 A1* | 6/2011 | Cho | G01R 29/0821 343/703 |
| 2012/0026060 A1* | 2/2012 | Hanazawa | H01Q 1/32 343/853 |
| 2013/0342403 A1* | 12/2013 | Katz | G01R 29/10 343/703 |
| 2017/0195975 A1 | 7/2017 | Sampath et al. | |
| 2017/0294953 A1 | 10/2017 | Ghosh et al. | |
| 2018/0263044 A1 | 9/2018 | Zhou et al. | |

FOREIGN PATENT DOCUMENTS

| | | |
|---|---|---|
| KR | 20110058825 A | 6/2011 |
| TW | 201141274 A | 11/2011 |
| WO | 2011112224 A1 | 9/2011 |

\* cited by examiner

ALTERING ANTENNA CONFIGURATION USING NETWORK AND CLIENT CONDITIONS

TECHNICAL FIELD

Embodiments presented in this disclosure generally relate to radio transmission configurations at access points in wireless networks utilizing 802.11ax and 802.11be specifications. More specifically, embodiments disclosed herein relate to adjusting the number of antennas transmitting for a given radio in order to increase the throughput and network performance for the radio.

BACKGROUND

With the advent of advanced Wi-Fi standards including Wi-Fi 6 standards (e.g., 802.11ax and 802.11be), access points operating under these standards are expected to support up to sixteen transmitting antennas. Moving to a higher number of transmitting antennas is beneficial in improving both transmit and receive diversity for a given radio in the access point. However, there are limits on the number of antennas that can be effectively used. One example cause for the limits includes the need to reduce correlation gain between transmitting antennas as the number of transmitting antennas increases. Furthermore, increasing the number of transmitting antennas without proper consideration for other network and connected client conditions can cause decreased performance in the network such as loss of connection to client devices at the edge of a wireless local area network among other adverse network conditions.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
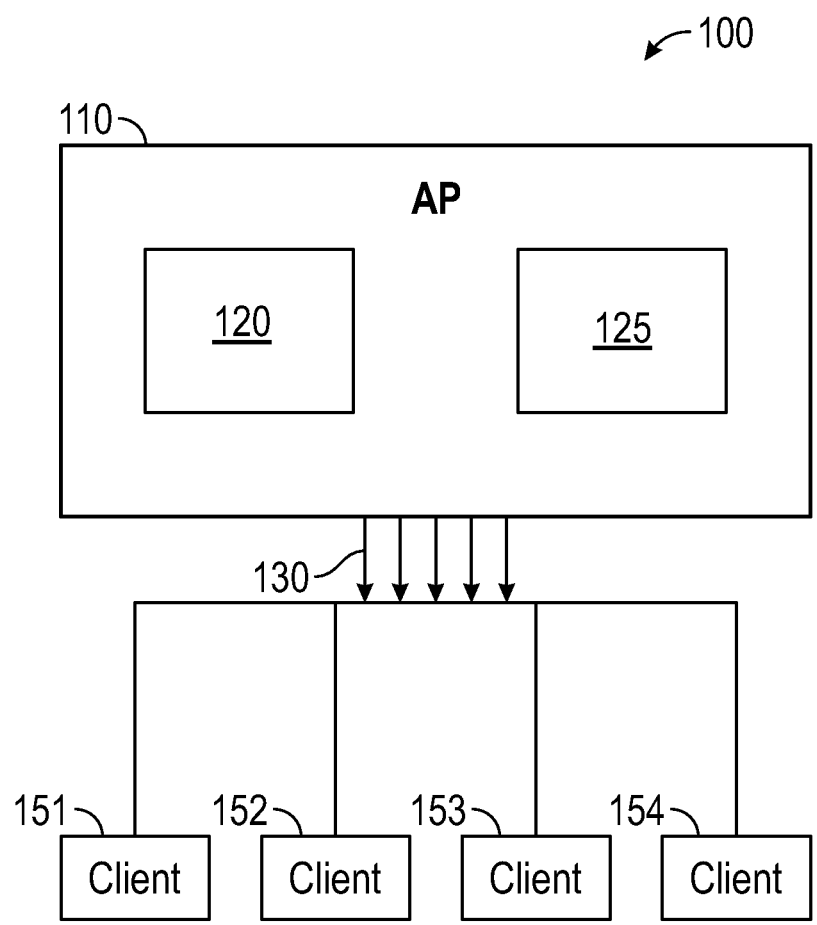
FIG. 1 illustrates a network including an access point and client devices, according to one embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method includes determining a preliminary antenna configuration for a radio in an access point, where the preliminary antenna configuration may include a first number of antennas transmitting at a first power level based on a maximum transmission power for the radio. The method also includes determining a second antenna configuration from the preliminary antenna configuration based on network level factors, where the second antenna configuration may include a second number of antennas, greater than the first number of antennas, where the second number of antennas transmit at a second power level. The method also includes determining a third antenna configuration from the second antenna configuration, where the third antenna configuration may include a third number of antennas transmitting at a third power level based on a client transmission factors for a plurality of client devices connected to the access point. The method also includes transmitting network traffic from the access point to the plurality of client devices using the third antenna configuration. Other embodiments of this aspect include corresponding computer systems, apparatus, and computer programs recorded on one or more computer storage devices, each configured to perform the actions of the methods.

Another example embodiment includes a system. The system includes a processor and a memory which may include instructions which, when executed on the processor, performs an operation. The operation may include: determining a preliminary antenna configuration for a radio in an access point, where the preliminary antenna configuration may include a first number of antennas transmitting at a first power level based on a maximum transmission power for the radio; determining a second antenna configuration from the preliminary antenna configuration based on network level factors, where the second antenna configuration may include a second number of antennas, greater than the first number of antennas, where the second number of antennas transmit at a second power level; determining a third antenna configuration from the second antenna configuration, where the third antenna configuration may include a third number of antennas transmitting at a third power level based on a client transmission factors for a plurality of client devices connected to the access point; and transmitting network traffic from the access point to the plurality of client devices using the third antenna configuration.

Another example embodiment includes a computer program product including a non-transitory computer-readable medium program having program instructions, where the program instructions are executable by a processor to perform an operation. The operation includes: determining a preliminary antenna configuration for a radio in an access point, where the preliminary antenna configuration may include a first number of antennas transmitting at a first power level based on a maximum transmission power for the radio. The product also includes determining a second antenna configuration from the preliminary antenna configuration based on network level factors, where the second antenna configuration may include a second number of antennas, greater than the first number of antennas, where the second number of antennas transmit at a second power level. The operation also includes determining a third antenna configuration from the second antenna configuration, where the third antenna configuration may include a third number of antennas transmitting at a third power level based on a client transmission factors for a plurality of client devices connected to the access point. The operation also includes transmitting network traffic from the access point to the plurality of client devices using the third antenna configuration.

Example Embodiments

As described above, as more advanced Wi-Fi standards are developed and implemented, the number of transmitting antennas supported by a single access point (AP) are increasing (e.g., an AP may support 16 or more transmitting antennas). While increased numbers of transmitting antennas provide more transmit and receive diversity for radios in the AP, a transmitting power from each antenna is reduced to meet regulatory standards. For example, regulating bodies at both the international and national levels often limit APs to only transmit a certain amount of radiated power from all powered radios and corresponding antennas.

In order to meet regulatory standards, as radio frequency (RF) chains are increased (e.g., antennas are powered on in an AP) the transmit power per RF chain is lowered to meet the regulatory limits for the AP. Furthermore, the transmitted power per RF chain also account for any effects of unintentional beamforming between the various RF chains (e.g., correlation gain). For example, if there are 4 antennas transmitting, then a transmission (Tx) power per path is reduced by 10 log(number of antennas) or 10 log(4)=6 dB to account for correlation gains. The same calculation and adjustment can be done for 8 transmitting antennas and/or 16 transmitting where the correlation gains are 9 dB and 12 dB, respectively.

For example, a regulatory standard may allow for maximum transmission at 23 dBm for a certain band or data rate at an AP. To transmit with 8 antennas, a per path transmit power is limited to 14 dBm to account for the 9 dB correlation gains. Limiting the transmit power to this lower number can result in connectivity issues and suboptimal performance for some clients in the wireless local area network service by the AP.

In order to address these issues some methods for antenna configuration have been developed, such as selecting a minimum number of transmission antennas as described in U.S. Pat. No. 8,971,443 B2 to Bosco et. al., (herein referred to as Bosco), which is incorporated herein by reference. In general, Bosco addresses the various transmit power issues described above by selecting a minimum number of transmit antennas based on a number of spatial streams supported by a modulation and coding scheme (MCS) for a given band/data rate. The process in Bosco maximizes the transmit power by limiting the effect of correlation gain. However, with the arrival of more complex MCS's in the 802.11ax and 802.11be specification, always selecting a lowest antenna configuration for an MCS may not the best option for a given radio and data rate. For example, if a data rate requires only two spatial streams, having more than two antennas enabled may result in lower power but with an added a benefit of improved diversity. In some cases, the added diversity improves a network traffic throughput for the data rate even at lower transmission powers.

The challenge to balance the number of transmitting antennas to improve the performance of the network while remaining within regulatory requirements remains. The systems and methods described herein provide for improved antenna configuration based on a preliminary minimum antenna configuration with adjustments to a number of transmitting antennas based on network conditions and client specific conditions. The number of transmitting antennas is increased when the network conditions and client specific conditions allow for the adjustment to increase diversity and connection throughput without causing connectivity problems in the network.

FIG. 1 illustrates a network 100, according to one embodiment. The network 100 includes an AP 110 which includes radios 120 and 125. While shown with two radios, the AP may include any number of radios. The AP 110 also includes a plurality of antennas, such as antennas 130, which transmit and send wireless transmission and communications to client devices 151-154 which are wirelessly connected to the AP 110.

As described herein the AP 110 determines an antenna configuration for various transmissions from the AP 110. Previous methods such as described in Bosco are mechanisms for increasing Tx power. In some examples, the determined configurations map an MCS index stored on the AP 110 to a particular antenna configuration which provides maximum Tx power. In some examples, the AP 110 also uses additional factors to determine antenna configurations according to the previous methods. For example, the AP 110 configures regulatory limit differences where different countries or regulatory domain have different limits for different bands. For example, a country A may have a much lower Tx power limit for a band as compared to a country B for the same band. In this example, the AP 110 generates the antenna configuration with fewer antennas to maximize Tx power for country A (e.g. within the limits set by the regulations) as opposed to country B.

Furthermore, some regulatory domains regulate a maximum conducted Power Spectral Density (PSD) limits in different frequency bands that are taken into account by the AP 110 when determining antenna configurations. The various regulatory domains may also include maximum Equivalent Isotropically Radiated Power (EIRP) limits and Out of Band Emission (OOBE) limits for certain band edges.

However, as discussed above, using only regulatory limits and methods to achieve a higher TX power from the AP 110 to the client devices 151-154 at the cost of reducing diversity gains is not always the best approach to achieve better network performance, such as increased throughput.

The AP 110 as described herein, also uses additional network and client level factors to determine antennae configurations. For example, the AP 110 considers RSSI levels, such as median, average, and/or individual client RSSI levels, to determine a quality of a link connected clients have to the AP 110. In an example where, most or all of the clients maintain a high quality link to the AP, then the antenna configuration may not be changed significantly, but may be altered in order to provide increased antenna diversity gains In another example, RRM configured transmit power is considered by the AP 110 in the determination of the antenna configuration. In an example in which an RRM configures a lower power level and the AP 110 is not operating at the limit, a reduced antenna configuration is not needed. Instead, the AP 110 determines an antenna configuration that will meet Tx power requirements while also using a maximum number of antennas. Other client level factors may also include a number of antennas supported on a client and a number of clients in the network 100, among other examples.

In the system and methods described herein, the AP 110 determines to change an antenna configuration that maximizes TX power for a particular client (e.g., across MCS combinations) and determines by how much to change or alter the antenna configuration using additional information such as additional network and client level information in order to increase diversity and improve network connections within the network. For example, the AP 110 may determine to increase or decrease a number of transmitting antennas in an antenna configuration for the client 151 based on operating conditions in the network 100, regulatory or standard limits, device configurations (e.g., radio resource management (RRM) configurations), and client conditions at the client device 151. Further details of this process are described in relation to FIG. 2.

Figure 2:
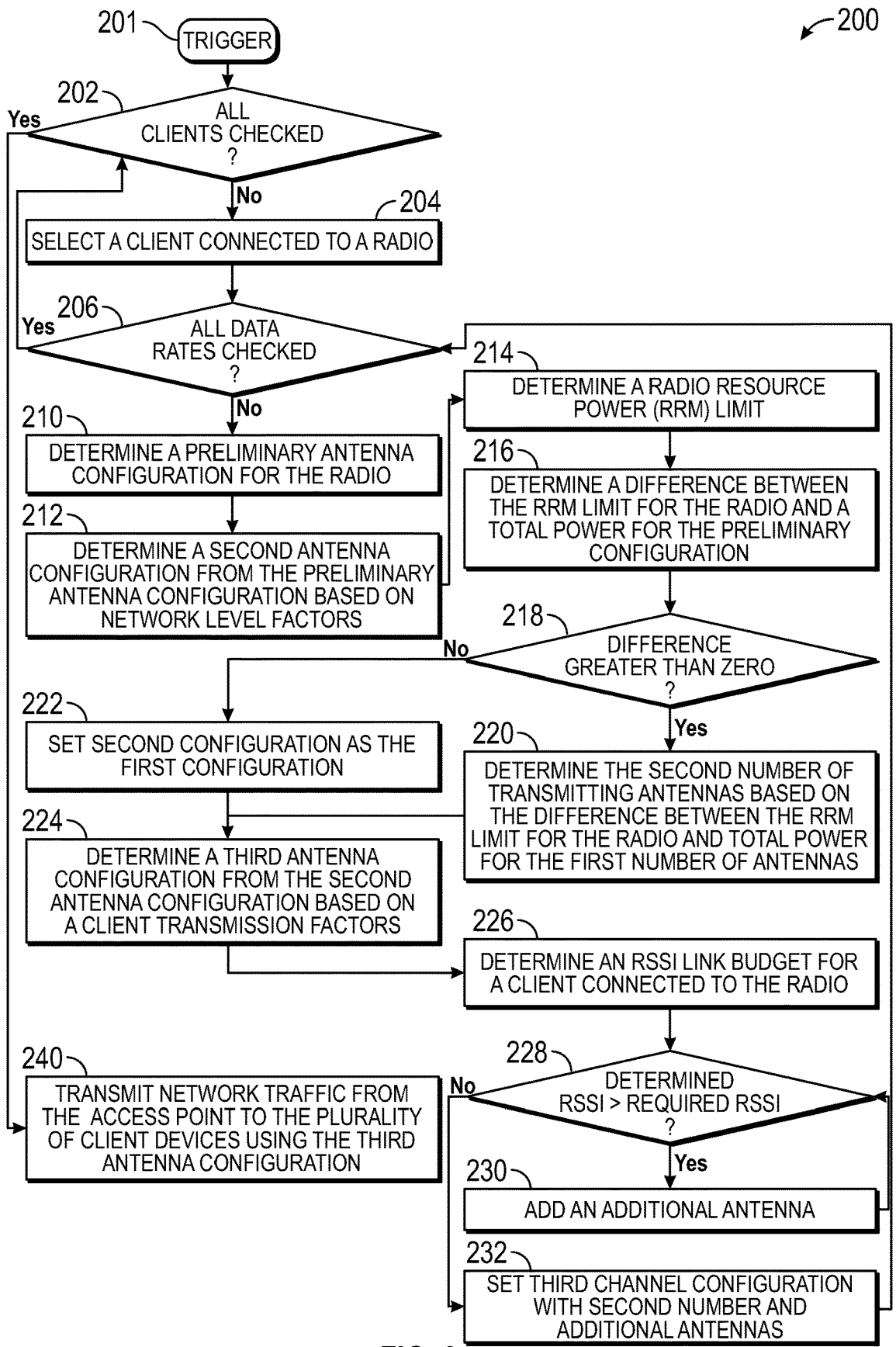
FIG. 2 is a method for antenna configuration, according to one embodiment.

FIG. 2 is a method for antenna configuration, according to one embodiment. For ease of discussion of method 200, reference will be made to network 100 as described in FIG. 1 and AP 110 as described in FIGS. 1 and 3. Method 200 begins at block 201. In some examples, method 200 begins or is triggered periodically at the AP 110 to ensure that the network is performing optimally for a connected client or a group of connected clients at a particular transmit or data rate. In some examples, a group of connected clients includes clients in a same basic service set (BSS) connected to the AP 110. For example, the client device 151-154 may be a part of a same BSS.

In some examples, the method 200 is triggered to ensure the number of transmitting antennas at the AP 110 provides a highest quality connection to client devices connected to the AP 110. In some examples, other triggers may also cause the AP 110 to perform the method 200 such as the addition of new clients in a BSS connected to the AP 110, transmit power configuration changes detected at the AP 110, and/or an addition of a new rateset at the AP 110, among other examples.

At block 202, the AP 110 selects a radio from the AP 110 and determines if all client devices connected to the radio have been processed or checked during a current iteration of method 200. For example, the AP 110 determines if all the connected client devices in a BSS have been checked since a most current trigger at block 201. In one example, the AP 110 selects the radio 120 and determines whether clients 151-154 have been checked or processed. In an example where unprocessed or unchecked clients remain, the AP 110 proceeds to block 204 of method 200 and selects a client connected to the radio. For example, the AP 110 selects the client 151 connected to the radio 120. The selected client is then processed through blocks 206-232 as described below to determine an optimal antenna configuration for providing a reliable and optimal connection to the selected client.

At block 206 the AP 110 determines if all data rates supported by the client have been checked. In some examples, the AP 110 consults client information 323 shown in FIG. 3, to determine the various data rates supported by the client. In one example, the client 151 supports at least a 2SS rate among other supported rates. The AP 110 then proceeds to block 210 of the method 200 and determines a preliminary antenna configuration based on the radio, the selected client, and the selected data rate. For example, the AP 110 determines a preliminary antenna configuration for the radio 125 in the access point 110, where the preliminary antenna configuration includes a first number of antennas transmitting at a first power level based on a maximum transmission power for the radio.

Figure 3:
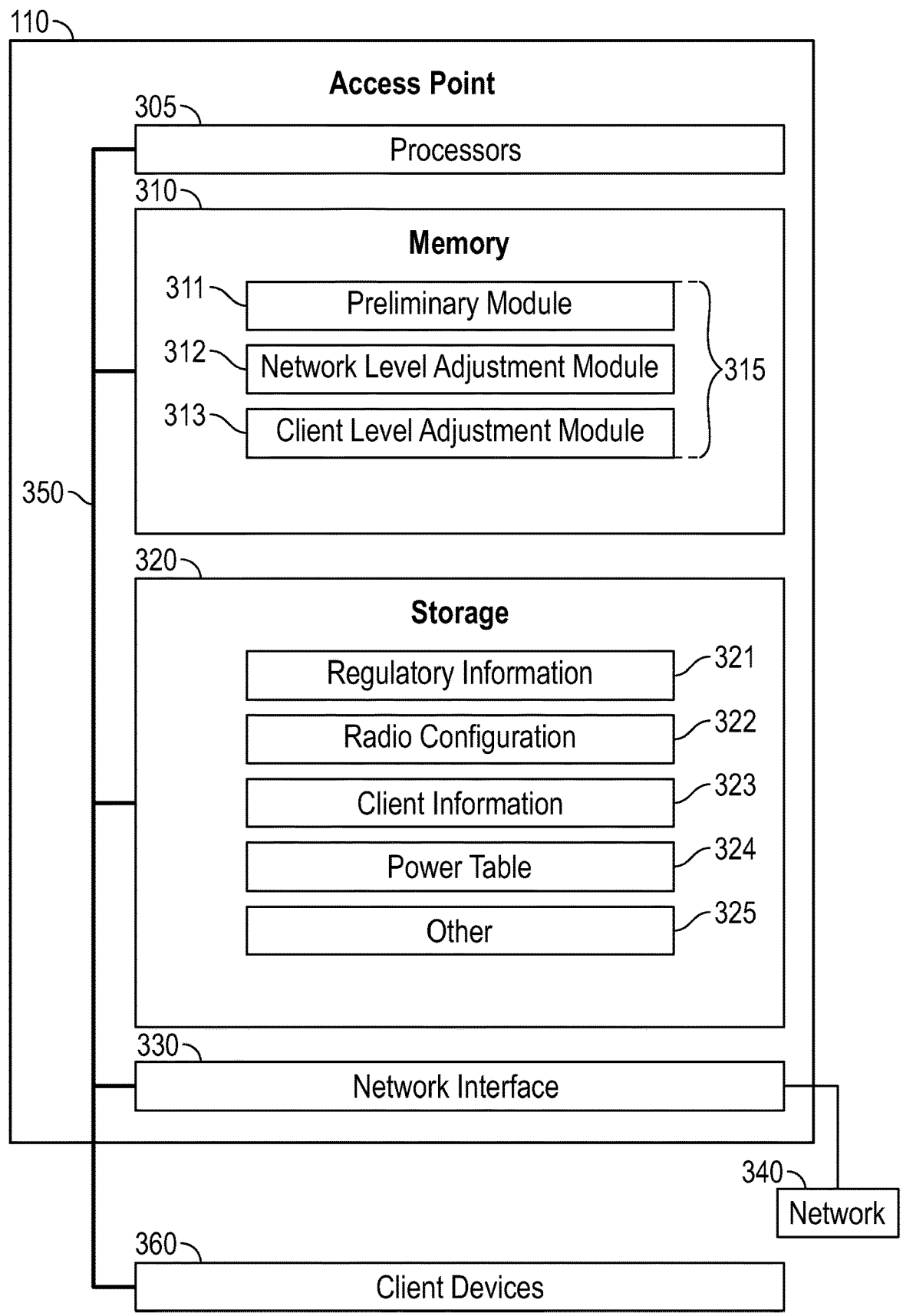
FIG. 3 is a block diagram of an access point, according to one embodiment.

In some examples, the preliminary configuration is determined by querying a radio configuration information 322 and a power table 324 shown in FIG. 3, where the radio configuration information 322 and the power table 324 includes the first number of transmitting antennas and the corresponding power levels for the selected rate according to set standards. For example, for the client 151 and the 2SS rate, the queried information indicates that the preliminary configuration includes a first number of two transmitting antennas with a transmission of power per antenna of 19.9897 dBm and a corresponding correlation gain of 3.010 dB. In some examples, the AP 110 tracks the preliminary configuration by setting the preliminary configuration equal to the queried information. The AP 110 also tracks a total power for the preliminary configuration by setting a total power value for the preliminary configuration as the power per path of the preliminary configuration and the correlation gain for the preliminary configuration. For example, the total power for the client 151 in the preliminary configuration in the 2SS rate is 19.9897 dBm+3 dB=23 db.

Once the preliminary configuration has been determined, the AP 110 proceeds to block 212 of method 200 where the AP 110 determines a second antenna configuration from the preliminary antenna configuration based on network level factors. For example, the AP 110 determines the second antenna configuration from the preliminary antenna configuration based on network level factors, where the second antenna configuration includes a second number of antennas. In some examples, the second number of antennas in the second antenna configuration is greater than the first number of antennas and the second number of antennas transmit at a second power level. In some examples, determining the second number of antennas and the second antenna configuration includes the operations described in blocks 214-222.

At block 214, the AP 110 determines a radio resource power (RRM) limit for the radio. For example, the radio 125 may operate using an RRM stored in the radio configuration information 322 shown in FIG. 3. For example, the AP 110 may query the radio configuration and determine that the RRM limit for the client 151 is 20 dBm. In some examples, the RRM limit is set by manufacturer or regulatory guidelines to ensure proper functioning of the AP 110 in the network 100.

At block 216, the AP 110 determines a difference between the RRM limit for the radio and at total power for the preliminary configuration. In the example regarding AP 110 and client 151, a total power of each path or antenna is 23 (19.9897 dBm transmission power per path+3.010 dB correlation gain). In order to ensure the power per path is below the RRM limit for the radio the RRM limit is subtracted from the conventional power per path to produce a tolerance that can be utilized to increase the number of transmitting antennas. For example 23−20=3 dB of tolerance.

At block 218, the AP 110 determines if the difference between the RRM limit for the radio and the total power for the preliminary configuration is greater than zero. If the difference is negative or zero then the method 200 proceeds to block 222 where the AP 110 sets the second configuration as the first configuration (i.e., the AP 110 does not alter the first configuration).

In another example, when the difference calculated at block 218 is greater than zero the method 200 proceeds to block 220 where the AP 110 determines from a power table for the radio, the second number of transmitting antennas based on the difference between the RRM limit for the radio and total power for the first number of antennas. For example, for the AP 110 iterates through the power table 324 using the 3 dB value determined at block 218 to determine that the 3 dB of tolerance allows for four transmitting antennas without violating the RRM limit of 20 and the total power per path limit of 23 dBm. For example, the second configuration for the client 151 is determined to be four transmitting antennas which transmit at 16.97 dBm per path with a correlation gain of 6 dB. Upon determining the second configuration, the AP 110 may consider the client level factors to further adjust the antenna configuration.

At block 224, the AP 110 determines a third antenna configuration from the second antenna configuration. In some examples, the third antenna configuration includes a third number of antennas transmitting at a third power level based on a client transmission factors for a plurality of client devices connected to the access point. In some examples, the third configuration is determined as described in relation to blocks 226-232.

At block 226, the AP 110 determines an RSSI link budget for a client connected to the radio. In some examples, the RSSI link budget for the client is based on a difference between an effective past radiated Tx power for the client and a past reported RSSI. In some examples, the AP 110 also determines a RSSI for a client based on a difference between the total power for the second configuration and the RSSI link budget. For example, a RSSI link budget for the client 151 is 70 dB and a computed RSSI for the client 151 is 22.979 dBm-70 dB=−47 dBm.

At block 228, the AP 110 determines if a determined RSSI for the client is greater than a required RSSI for the client. In an example where the determined RSSI is greater than the RSSI link budget, the AP 110 proceeds to block 230 where an additional antenna is added to the second number. The total power per path is recalculated at block 228 and compared to the RSSI link budget and used to determine an updated RSSI for the client. The AP 110 iterates through blocks 228 and 230 until the RSSI for the client is not greater than the required RSSI for the client. For example, for the client 151, the AP 110 adds an additional antenna increasing the number of antennas to five transmitting antennas where the total power per path is 16.01 dBm with a correlation gain of 7 dB.

In the example where the RSSI for the client is not greater than the required RSSI for the client, the AP 110 proceeds to block 232 where the AP 110 sets the third channel configuration with the second number and any additional antennas added to the second number, such as those added in block 230.

Method 200 proceeds back to block 206 where the AP 110 determines if all data rates supported by the client have been checked. When all data rates have been checked, the method 200 returns back to block 202 and determines if all client devices connected to the radio have been processed or checked during a current iteration of method 200. In an example where all clients have been checked, the method 200 proceeds to block 240 where the AP 110 transmits network traffic from the access point to the plurality of client devices using the third antenna configuration.

FIG. 3 illustrates a block diagram of an AP 110 according to one embodiment. The AP 110 is shown in the form of a general-purpose computing device. The components of AP 110 may include, but are not limited to, one or more processing units or processors 305, a system memory 310, a storage system 320, a network interface 330 to network 340, and a bus 350 that couples various system components including the system memory 310 and storage system 320 to processors 305 along with the network interface 330, and client devices 360. The AP 110 provides network connections and transmits control signals and radio transmission information, among other signals to client devices in an associated network cell, such as the network 100. In other embodiments, the AP 110 is distributed and includes a plurality of discrete computing devices that are connected through wired or wireless networking.

The bus 350 represents one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

AP 110 typically includes a variety of computer system readable media. Such media may be any available media that is accessible by AP 110, and it includes both volatile and non-volatile media, removable and non-removable media.

System memory 310 can include computer system readable media in the form of volatile memory, such as random access memory (RAM) and/or cache memory. AP 110 may further include other removable/non-removable, volatile/non-volatile computer system storage media. In some examples, storage system 320 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 350 by one or more data media interfaces. As further depicted and described below, system memory 310 includes include at least one program product having a set (e.g., at least one) of program modules 315 that are configured to carry out the functions of embodiments of the AP and program modules 315 described herein. AP 110 may further include other removable/non-removable volatile/non-volatile computer system storage media. In some examples, storage system 320 may be included as part of memory 310 and may typically provide a non-volatile memory for the networked computing devices, and may include one or more different storage elements such as Flash memory, a hard disk drive, a solid state drive, an optical storage device, and/or a magnetic storage device. Storage system 320 may include media for storing regulatory information 321, radio configuration information 322, client information 323, a power table 324, and other information used by the AP 110. The information stored in storage system 320 may be updated and accessed by the program modules 315 described herein.

Memory 310 may include a plurality of program modules 315 for performing various functions related the function of the AP 110 such as preliminary module 311, network level assignment module 312, and client level adjustment module 313. The program modules 315 generally include program code that is executable by one or more of the processors 305.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
    determining a preliminary antenna configuration for a radio in an access point, wherein the preliminary antenna configuration comprises a first number of antennas transmitting at a first power level based on a maximum transmission power for the radio;
    determining a second antenna configuration from the preliminary antenna configuration based on network level factors, wherein the second antenna configuration comprises a second number of antennas, greater than the first number of antennas, wherein the second number of antennas transmits at a second power level;
    determining a third antenna configuration from the second antenna configuration, wherein the third antenna configuration comprises a third number of antennas transmitting at a third power level based on a client transmission factor for a plurality of client devices connected to the access point; and
    transmitting network traffic from the access point to the plurality of client devices using the third antenna configuration.

2. The method of claim 1, wherein the preliminary antenna configuration is calculated based on a minimum number of transmit antennas for a number of spatial streams modulation and coding scheme (MCS) supported by the access point, wherein the first number of antennas is the minimum number.

3. The method of claim 1, wherein determining the second antenna configuration comprises:
    determining a radio resource power (RRM) limit for the radio;

determining a difference between the RRM limit for the radio and a total power for the first number of antennas; and determining from a power table for the radio, the second number of transmitting antennas based on the difference between the RRM limit for the radio and total power for the first number of antennas.

4. The method of claim 3, wherein the total power from the second number comprises the transmission power from the second number of transmitting antennas and a correlation gain from the second number of transmitting antennas.

5. The method of claim 3, wherein the determining the third antenna configuration comprises:
determining an RSSI link budget for a client connected to the radio; and
wherein a determined RSSI for the client is greater than a required RSSI for the client the method further comprises:
iteratively add an additional antenna to the second number of transmitting antennas until a determined RSSI for the client with the second number and the additional antennas is not greater than the required RSSI for the client.

6. The method of claim 1, wherein the method further comprises:
determining a first antenna configuration, a second antenna configuration, and a third antenna configuration for each data rate of a plurality of data rates supported by the plurality of clients connected to the radio.

7. The method of claim 1, wherein the method further comprises:
determining a first antenna configuration, a second antenna configuration, and a third antenna configuration for each of the plurality of clients connected to the radio.

8. A system comprising:
a processor; and
a memory comprising instructions which, when executed on the processor, performs an operation, the operation comprising:
determining a preliminary antenna configuration for a radio in an access point, wherein the preliminary antenna configuration comprises a first number of antennas transmitting at a first power level based on a maximum transmission power for the radio;
determining a second antenna configuration from the preliminary antenna configuration based on network level factors, wherein the second antenna configuration comprises a second number of antennas, greater than the first number of antennas, wherein the second number of antennas transmit at a second power level;
determining a third antenna configuration from the second antenna configuration, wherein the third antenna configuration comprises a third number of antennas transmitting at a third power level based on a client transmission factor for a plurality of client devices connected to the access point; and
transmitting network traffic from the access point to the plurality of client devices using the third antenna configuration.

9. The system of claim 8, wherein the preliminary antenna configuration is calculated based on a minimum number of transmit antennas for a number of spatial streams modulation and coding scheme (MCS) supported by the access point, wherein the first number of antennas is the minimum number.

10. The system of claim 8, wherein determining the second antenna configuration comprises:
determining a radio resource power (RRM) limit for the radio;
determining a difference between the RRM limit for the radio and a total power for the first number of antennas; and
determining from a power table for the radio, the second number of transmitting antennas based on the difference between the RRM limit for the radio and total power for the first number of antennas.

11. The system of claim 10, wherein the total power from the second number comprises the transmission power from the second number of transmitting antennas and a correlation gain from the second number of transmitting antennas.

12. The system of claim 10, wherein the determining the third antenna configuration comprises:
determining an RSSI link budget for a client connected to the radio; and
wherein a determined RSSI for the client is greater than a required RSSI for the client the operation further comprises:
iteratively add an additional antenna to the second number of transmitting antennas until a determined RSSI for the client with the second number and the additional antennas is not greater than the required RSSI for the client.

13. The system of claim 8, wherein the operation further comprises:
determining a first antenna configuration, a second antenna configuration, and a third antenna configuration for each data rate of a plurality of data rates supported by the plurality of clients connected to the radio.

14. The system of claim 8, wherein the operation further comprises:
determining a first antenna configuration, a second antenna configuration, and a third antenna configuration for each of the plurality of clients connected to the radio.

15. A computer program product comprising a non-transitory computer-readable medium program having program instructions embodied therewith, the program instructions executable by a processor to perform an operation comprising:
determining a preliminary antenna configuration for a radio in an access point, wherein the preliminary antenna configuration comprises a first number of antennas transmitting at a first power level based on a maximum transmission power for the radio;
determining a second antenna configuration from the preliminary antenna configuration based on network level factors, wherein the second antenna configuration comprises a second number of antennas, greater than the first number of antennas, wherein the second number of antennas transmit at a second power level;
determining a third antenna configuration from the second antenna configuration, wherein the third antenna configuration comprises a third number of antennas transmitting at a third power level based on a client transmission factor for a plurality of client devices connected to the access point; and transmitting network traffic from the access point to the plurality of client devices using the third antenna configuration.

16. The computer program product of claim 15, wherein the preliminary antenna configuration is calculated based on a minimum number of transmit antennas for a number of spatial streams modulation and coding scheme (MCS) supported by the access point, wherein the first number of antennas is the minimum number.

17. The computer program product of claim 15, wherein determining the second antenna configuration comprises:
   determining a radio resource power (RRM) limit for the radio;
   determining a difference between the RRM limit for the radio and a total power for the first number of antennas; and
   determining from a power table for the radio, the second number of transmitting antennas based on the difference between the RRM limit for the radio and total power for the first number of antennas.

18. The computer program product of claim 17, wherein the total power from the second number comprises the transmission power from the second number of transmitting antennas and a correlation gain from the second number of transmitting antennas.

19. The computer program product of claim 17, wherein the determining the third antenna configuration comprises:
   determining an RSSI link budget for a client connected to the radio; and
   wherein a determined RSSI for the client is greater than a required RSSI for the client the operation further comprises:
   iteratively add an additional antenna to the second number of transmitting antennas until a determined RSSI for the client with the second number and the additional antennas is not greater than the required RSSI for the client.

20. The computer program product of claim 15, wherein the operation further comprises:
   determining a first antenna configuration, a second antenna configuration, and a third antenna configuration for each data rate of a plurality of data rates supported by the plurality of clients connected to the radio.

* * * * *